July 10, 1934.                C. R. PIEPER              1,966,133
                              HEATING DEVICE
                       Filed March 30, 1933        2 Sheets-Sheet 1
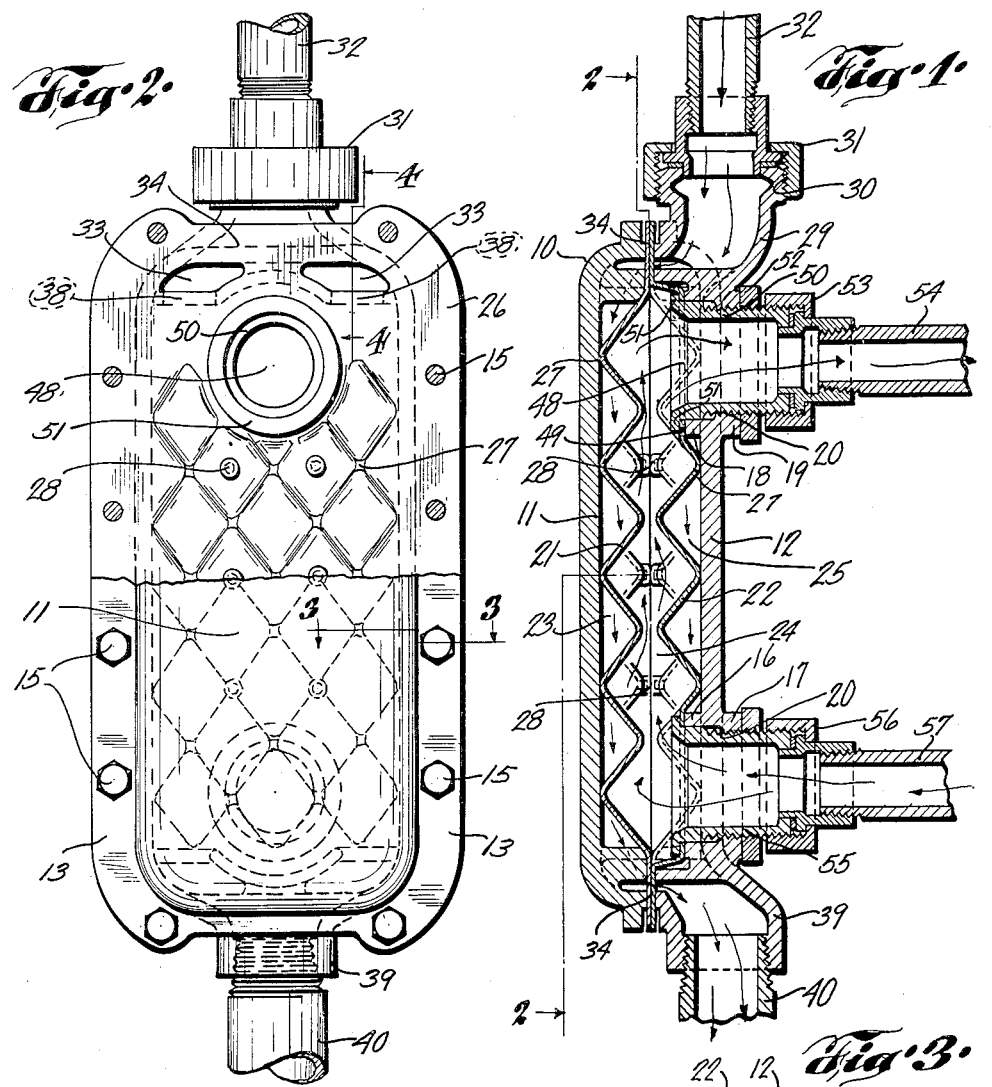
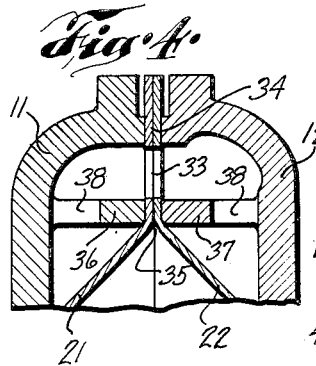
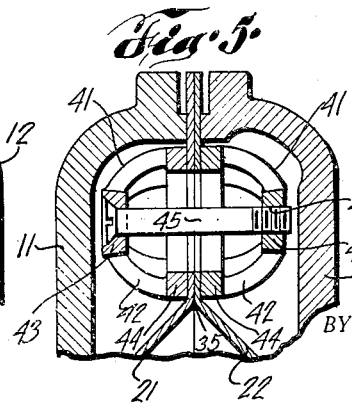
INVENTOR.
CHESTER R. PIEPER
BY
ATTORNEY

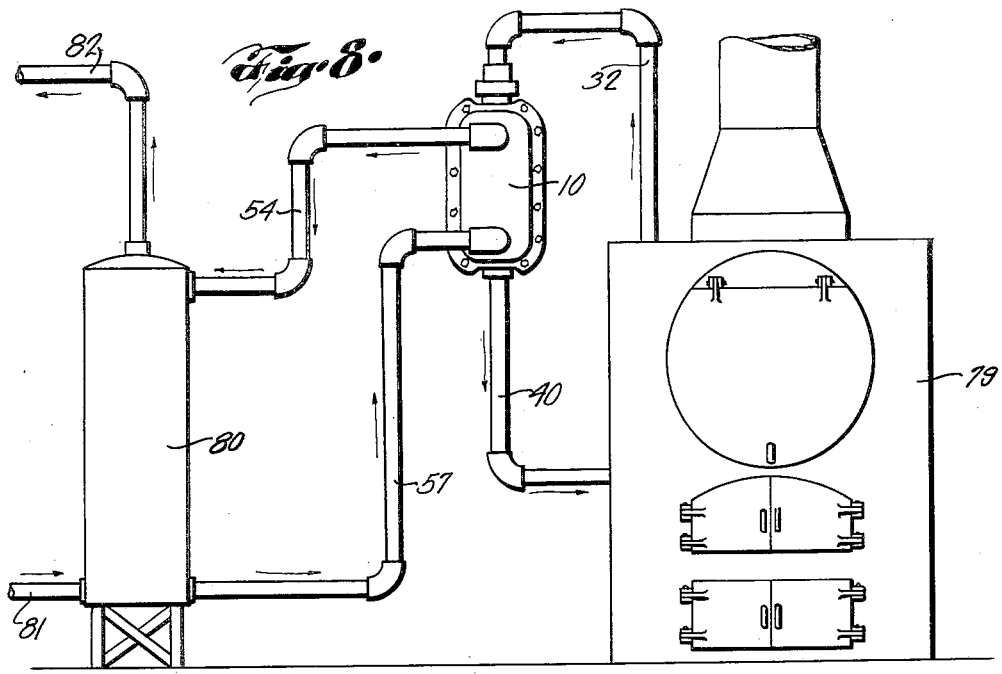
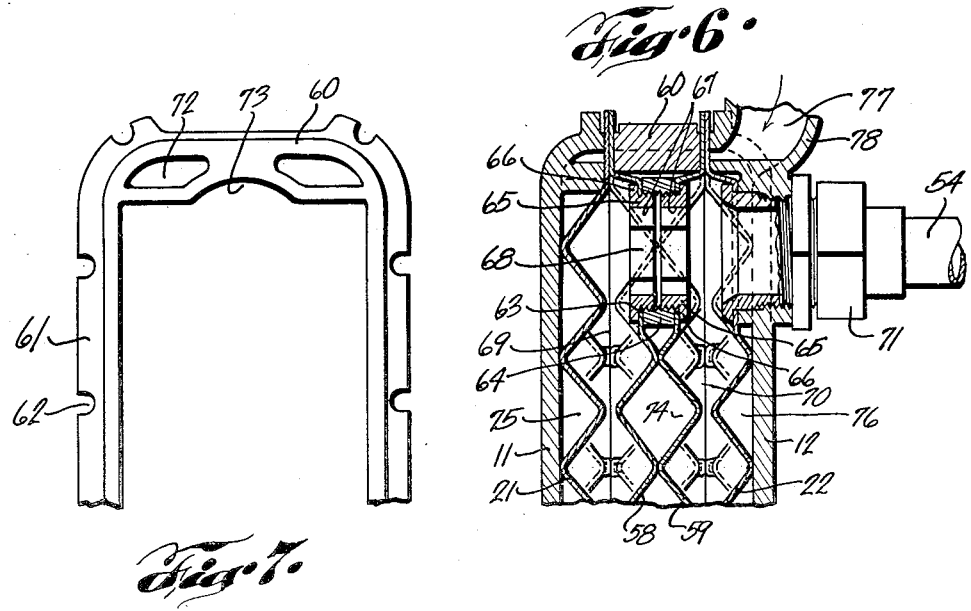

Patented July 10, 1934

1,966,133

UNITED STATES PATENT OFFICE 1,966,133

HEATING DEVICE

Chester R. Pieper, La Crosse, Wis.

Application March 30, 1933, Serial No. 663,491

11 Claims. (Cl. 257—245)

This invention relates to improvements in heating devices, and more particularly to an improved heater unit for use in home water systems and the like.

An object of the present invention is to provide an improved heater unit which is readily applicable to home water systems and the like, and which requires a relatively small mounting space.

Another object is attained in the provision of a heater unit, wherein water or other liquid to be heated, is conducted over and about a series of baffle projections which are arranged to be heated by a heating agent, such as hot water or steam from a heating boiler, or like source.

A further object is to provide a heater unit in which the several parts are formed and assembled in such manner as to permit the unit to be readily and easily disassembled for the purpose of inspecting, cleaning, the removal of scale, or replacement of parts.

A still further object is to provide a heater unit, which, by reason of the construction and assembly of its several parts, may be readily enlarged and expanded to include additional heating elements, whereby the capacity of the unit may be augmented to care for an increase in heating requirements; this facility for assembling units of any reasonable required capacity from standard elements or parts, serving to minimize dealers and jobbers stocks, and yet supply all requirements of the trade.

Further objects and advantages will appear from the following description, and from the appended drawings.

For convenience in description, and as an example of its application, the heater unit will be presently described in connection with a hot water furnace, of a type generally employed in domestic heating systems, and a hot water storage tank of a suitable type. However, being essentially a device for installation in two or more fluid circuits, from one of which heat is to be transferred to another, the unit may be considered broadly as a heat exchanger, and capable of adaptation for the manifold industrial and other uses in which fluid heat transfer and/or recovery devices are advantageously employed.

In the drawings, Fig. 1 is a sectional elevation of a heating unit embodying the improvements of the present invention; Fig. 2 is an elevation of the unit, showing certain parts broken away, the assembly being shown as viewed along line 2—2 in Fig. 1; Fig. 3 is an enlarged, fragmentary, sectional elevation of a portion of the unit, as taken along line 3—3 in Fig. 2; Fig. 4 is an enlarged fragmentary sectional elevation of a portion of the device, as taken along line 4—4 in Fig. 2; Fig. 5 illustrates a modification of the portion of the unit shown in Fig. 4; Fig. 6 is an enlarged fragmentary elevation of the device, modified to include additional heating elements; Fig. 7 is a fragmentary elevation of a spacer member employed in enlarging the heater device according to Fig. 6, and Fig. 8 illustrates an application of the assembled heater unit.

Referring now to the drawings by numerals of reference, 10 designates, generally, a heater case or enclosure which is composed preferably of two sections or castings 11 and 12. Each of the sections is formed with an outwardly extending peripheral flange 13, having spaced bolt-receiving apertures 14 for assembly bolts 15 which clamp the sections in assembled relation. Paired, longitudinally spaced boss portions 16—17, and 18—19, respectively, are formed on the case section 12, the boss portions 16 and 18 being disposed inwardly of the section, and the boss portions 17 and 19, outwardly thereof, as best appears in Fig. 1. An aperture 20, centrally disposed through each pair of boss portions and the case section, is provided for a purpose which will presently appear. Spaced, surfically indented partitions or baffle plates 21 and 22, arranged in opposed paired relation, serve to divide the interior of the case into separate compartments or passages 23, 24 and 25. The indented or corrugated baffle members are each provided with a peripheral flange portion 26 which is adapted to be clamped between the flanges 13 of the case sections, as shown in Fig. 3. Gaskets (not shown) may be inserted between each adjacent pair of flanges to prevent water leakage from within the casing. The baffle plates, which may be formed from sheet metal, or any other suitable material which has been treated to resist the corrosive effects of liquids such as water, are each shaped to present a plurality of diamond shaped pyramidal projections 27, the projections being provided to obtain a large heating surface in the relatively small space within the heater casing. Lugs 28 formed on the apex portions of a number of the projections on each plate, are provided to maintain the plates in spaced relation, as clearly appears in Fig. 1.

An inlet extension 29, formed as an integral part of the upper end of the case section 12, is threaded externally on its free end, as at 30, to receive a union 31 on the end of an inlet pipe 32. The inner end of the extension opens into the chamber or passage 25, and is connected with the pasage 23 through apertures 33 in the abutting end portions 34 of the baffle plates, Figs. 2 and 4. In order to prevent any leakage between the central passage 24 and the outer passages 23 and 25 at the juncture 35 of the baffle plates, Fig. 4, an inwardly extending, lateral wall 36 preferably formed integrally with the case section 11, and a similar complementary wall 37 on the case section 12, are provided to compress the baffle flanges at the juncture 35 when the several parts are in assembled relation. If it is desired, a gasket (not shown) may be interposed between the abutting flange portions, at the juncture 35, to insure further against leakage. Apertures 38 in the walls 36 and 37 open the passages 23 and 25 to the inlet passage 29. An outlet extension 39, similar to the inlet extension 29, formed on the lower end of the case section 12 and internally threaded on its free end to receive one end of an outlet pipe 40, is provided as an outlet for the passages 23 and 25. The passages are interconnected at the outlet end, and the juncture 35 of the baffle plates at the lower end of the assembly are or may be secured against leakage, in the same manner as at the upper or inlet end of the unit, as illustrated in Figs. 2 and 4.

A modification in the method of clamping the abutting baffle plate flange portions at the juncture 35, is illustrated in Fig. 5. Substantially cup-shaped members 41, each having a plurality of arms 42 extending in an arcuate manner from a base portion 43, and a ring 44 integral with and connecting the free ends of the arms, are disposed in clamping position, one on each side of the abutting flange portions 34, each member 41 having its ring portion 44 seated upon the baffle flange rim portion which defines the aperture 33. The members 41 are drawn together by a screw 45 having its head portion seated in the base portion 43 of one member, and its threaded end in a tapped aperture 46 in the base 43, of the opposite member. As before, a gasket ring (not shown) may be inserted between the flange portions before the clamping members are drawn together by the screw 45. The openings between the arms of the clamping members, and the aperture 33, serve to interconnect the passage 23 with the passage 25 and the inlet 29.

An aperture 48, adjacent the upper end of the baffle plate 22 and in alignment with the aperture 20 through the bosses 18 and 19 and the case section, is provided as an outlet for the inner chamber 24. The portion 49 of the plate 22 bounding the aperture 48, is seated upon the inner boss 18 of the case. The boss 19 is internally threaded to engage an externally threaded tubular member or conduit 50 which extends through the outlet aperture 20. The sleeve or conduit 50 is provided with a flanged shoulder portion 51 on its inner end, which is adapted to clamp the baffle plate portion 49 against the boss 18, in fluid-tight relation. If it is desired, a gasket (not shown) may be employed between the shoulder and baffle plate portion 49, to further secure against leakage. As will be noted in Fig. 1, the outer threaded end of the sleeve extends beyond the boss 19 to receive a lock nut 52, which, when drawn up against the boss 19, securely holds the sleeve in the aperture 20. The free end of the sleeve has secured thereon an outlet union 53 for receiving one end of an outlet pipe 54. An inlet assembly at the lower end of the unit, including a sleeve 55 through the aperture 20 which extends through the boss portions 16 and 17 and case section 12, and a union 56, are assembled in the same manner as the outlet assembly associated with the uppermost aperture 20. One end of an inlet pipe 57 is secured to the inlet assembly by the union 56.

Fig. 6 illustrates a modification in the heater to include an extension element which permits the insertion of additional baffle plates, whereby to increase the heating surface and capacity of the unit. The case section 11 and its associated baffle plate 21 are spaced apart from the case section 12 and baffle plate 22 to provide for the insertion therebetween, of additional baffle plates 58 and 59, which may be identical with the plates 21 and 22, and an extension or spacer member 60. The spacer member is provided with a peripheral flange 61 having spaced slots 62 therein to accommodate case assembly bolts (not shown) on the order of those shown at 15 in Figs. 2 and 3. The plate 58 is disposed on one side of the spacer member 60, and the plate 59 on the other side thereof, the plates having their flange portions abutting, respectively, the flange portions of the plates 21 and 22.

An aperture 63 is provided adjacent the upper end of each of the plates 58 and 59, with the marginal portion of each aperture seated against an end face of an internally threaded spacer ring 64, disposed between the plates. Threadedly engaging the ring 64, one on each side thereof, are clamping nuts 65, each having a shoulder portion 66 adapted to clamp the apertured marginal portion of one of the baffle plates, against the end of the spacer ring 64. An aperture 67 in each of the nuts 65 is provided to form a connecting passage 68 between the chamber or passage 69 formed by the plates 21 and 58, and the chamber 70 formed by the plates 22 and 59. An outlet connection 71, serving the chambers 69 and 70, is provided in the case section 12, and is substantially like that provided for the central chamber 24 of the heater unit shown in Fig. 1. Passages or conduits 72 and the cut-away portion 73 in the spacer member 60, and slots (not shown) through the baffle plate flanges, aligning with the passages 72 in the member 60 serve to interconnect the central passage 74, formed between the plates 58 and 59, and the outer passages 75 and 76, formed between the case section 11 and plate 21, and case section 12 and plate 22, respectively, with the inlet passage 77 in the extension 78. The construction and manner of assembly of the upper portion of the heater unit applies equally to the lower end of the unit. It is to be understood that the heater unit may be enlarged still further by the introduction of additional baffle plates and spacer members.

Fig. 8 illustrates one application of the present improved heater unit, the heater being shown as interposed between a steam or hot water furnace 79, and a hot water storage tank 80. The tank 80 is supplied with cold water through a delivery pipe 81 from a water main or other source, (not shown), the pipe 81 entering the bottom end of the tank. A pipe 57 conducts cold water from the lower end of the tank 80 to the heater, whence the water flows through the heater passage 24, Fig. 1 containing baffle projections 27, is heated, and thence is returned to the top portion of the storage tank through pipe 54, whence the hot water in the top of the tank may be drawn off through the delivery supply pipe 82, as desired. The heating agent employed in the unit may be either hot water or steam from the boiler of the furnace 79. For example, if hot water is used, it may be conducted to the heater through pipe 32 and returned to the boiler through pipe 40. Within the heater, the heating agent passes through the passages 23 and 25, heating the baffle plates as it flows therethrough.

The arrangement of the modified unit of Fig. 6, in the fluid circuits, may be substantially the same as in the case of the unit of Fig. 1. In the modified unit, the flow of steam, hot water or other heating fluid is through passages 74, 75 and 76, the heating fluid entering the unit through pipe 32. The fluid to be heated, such as water, flows through the intervening passages 69 and 70, water and other connections being provided and located conveniently, as in Figs. 1 and 8.

The simple construction and manner of assembly of the several heater parts allows the heater unit to be readily dismantled for cleaning or repairing any of the parts thereof. This feature of the device is important, particularly if the water supply contains mineral or other impurities which may be precipitated to form encrustations or scale on the baffle plates. Unless the deposits on the baffle plates are removed periodically, the operation and efficiency of the heater device would be affected seriously. Hence the need for a heater unit which may be readily and easily disassembled.

It is to be understood that the invention is not to be limited by the specific forms of the presently described embodiments, as they may be altered or modified without departing from the spirit and full intended scope of the invention, as defined in the appended claims.

I claim:

1. In a heater unit of a type adapted for connection into two distinct fluid circuits, a casing formed of hollow companion wall elements, a baffle element detachably disposed between said wall elements, and consisting of a plate-like structure adapted to define a path of fluid flow along at least one of said wall elements, and in a direction from end to end thereof, inlet and outlet ports formed in at least one of said wall portions and near the opposite ends thereof, marginal projections on the wall elements, and holding elements common to the baffle and wall elements whereby the said elements are detachably and marginally secured in assembled relation.

2. In a heater unit, a pair of coacting cover members forming a heater enclosure, a plurality of plates within said enclosure, said cover members and plates being spaced to provide fluid passages therebetween, means within the enclosure serving to interconnect certain of said passages, means providing an inlet and an outlet for said interconnected passages, and means on one of said cover members providing an inlet and an outlet for other of the passages within the enclosure.

3. A heater unit comprising a pair of hollow companion members forming a heater case, a pair of plate elements within said case, the coacting members of said case and said plates being spaced from each other to provide separate passages in said case, said passages including a central passage and outer passages, said plate element being characterized by upset or indented areas, resulting in a tortuous trend of at least certain of the said passages, and a pair of conduits extending laterally through one of the case members communicating with said central passages providing an inlet and an outlet therefor.

4. A heater unit comprising a pair of marginally flanged cover members coacting to form a heater case, a pair of baffle plates within the case and having peripheral flanged portions adapted to be held between the flanged portions of the cover members in fluid tight relation, said plates being spaced with respect to each other, and to the cover members to provide separate fluid passages, said passages including a central passage, and a pair of conduits extending through one of said cover members and communicating with said central passage, providing an inlet and an outlet therefor.

5. In a heater unit, a pair of companion, hollow flanged members forming a heater case, a pair of plates within the case having corresponding and registrable flange portions adapted to be clamped between the flange portions of the case members, said plates forming a central passage and outer passages within the case, a passage through the flanged portions of said plates, and interconnecting said outer passages, and a tubular member extending through a case member and one of said plates, providing access to said central passage.

6. A heater unit comprising a pair of coacting members forming a heater case, a pair of deformed plates within said case, and spaced to form a central passage and outer passages, said outer passages being interconnected by an aperture through said plates, and clamping elements engaging said plates for securing the plates together and preventing fluid communication between the outer passages and said central passage.

7. A heater unit comprising a pair of hollow members forming opposite walls of a heater case, a pair of flanged baffle plates within said case, said plates being in spaced relation and having their flange portions in abutting relation between the case members, the case members and spaced plates providing a central passage and outer passages within the case, portions of said abutting flanges having an aperture therethrough interconnecting said outer passages, and an apertured wall extending inwardly of each case member and coacting to clamp the abutting flange portions of the plates, adjacent said flange aperture.

8. A heater unit comprising a pair of members constituting opposite walls of a heater case, a pair of baffle plates within said case and having peripheral flange portions adapted to be held in fluid tight, abutting relation between said case members, the case members and plates providing a central passage and outer passages within the case, said plate flanges having an opening therethrough, interconnecting said outer passages, and detachable means, carried by marginal portions of said opening, adapted to clamp the abutting flange portions, adjacent said opening, in fluid tight relation.

9. In a device for transferring heat between distinct circulating fluids, a casing including a pair of companion hollow wall elements, a plurality of plate elements formed of sheet metal and disposed in pairs internally of the casing, a spacer forming a marginal wall portion of the casing and arranged between the hollow wall elements thereof, the wall elements, spacer and marginal portions of the plate elements coacting in assembly to form passages or chambers internally of the structure and laterally of the casing elements and plates, and distinct fluid connections for the several fluids to be circulated through the passages of the casing.

10. In a device for transferring heat between distinct circulating fluids, a casing consisting of companion hollow wall elements forming the sides of the casing, a spacer element marginally clamped between the said hollow wall elements, a plurality of corrugated plate elements formed of sheet metal and arranged in pairs with those of each pair in opposed relation, peripheral flange portions on each of said plate elements, the flange portions of each pair of the plate elements extending between the spacer element and one of said hollow wall elements, and detachably assembled in fluid tight relation thereto, means forming an internal connection between spaces interiorly of different pairs of said plate elements, means forming external fluid connections for a plurality of distinct fluids to other spaces within said casing.

11. A heater unit comprising a pair of companion hollow members assembled to form a heater case, a pair of plates, each characterized by an intermediate area having alternately disposed pyramidal projections and recesses, grid plates having their intermediate areas spaced within said case, and having plane peripheral abutting flange portions adapted to be held together in fluid tight relation between said case members, the case members and plates providing a central passage and outer passages within the case, a passage through a portion of said abutting flanges interconnecting said outer passages, clamping elements engaging marginal portions of said flanges about said flange passage adapted to produce a fluid tight contact between abutting portions of said plate flanges and about said flange passage, an inlet and an outlet for said interconnected passages, and conduits extending transversely through one of said plates and a case member, providing an inlet and an outlet for said central passage.

CHESTER R. PIEPER.